(12) United States Patent
Dittrich (10) Patent No.: US 8,700,745 B2
(45) Date of Patent: Apr. 15, 2014

(54) LIFE-CYCLE MANAGEMENT OF MULTI-TENANT SAAS APPLICATIONS

(75) Inventor: Wolfgang Paul Wilhelm Dittrich, Heidelberg (DE)

(73) Assignee: SAP AG, Walldorf (DE)

( * ) Notice: Subject to any disclaimer, the term of this patent is extended or adjusted under 35 U.S.C. 154(b) by 298 days.

(21) Appl. No.: 12/771,615

(22) Filed: Apr. 30, 2010

(65) Prior Publication Data

US 2011/0271278 A1  Nov. 3, 2011

(51) Int. Cl.
  *G06F 15/177* (2006.01)
  *G06F 9/44* (2006.01)
(52) U.S. Cl.
  USPC .......................................... 709/220; 717/168
(58) Field of Classification Search
  USPC ............................ 709/220, 221; 717/168–173
  See application file for complete search history.

(56) References Cited

U.S. PATENT DOCUMENTS

| | | | | |
|---|---|---|---|---|
| 7,447,854 | B1 * | 11/2008 | Cannon | 711/162 |
| 7,640,409 | B1 * | 12/2009 | Stafford et al. | 711/162 |
| 2007/0011670 | A1 * | 1/2007 | Nguyen et al. | 717/168 |
| 2007/0294676 | A1 | 12/2007 | Mellor et al. | |
| 2010/0198730 | A1 * | 8/2010 | Ahmed et al. | 705/50 |
| 2010/0205594 | A1 * | 8/2010 | Jirka | 717/170 |
| 2011/0010394 | A1 * | 1/2011 | Carew et al. | 707/793 |

FOREIGN PATENT DOCUMENTS

EP  2107459 A1  10/2009

OTHER PUBLICATIONS

"Systems and software engineering—Software life cycle processes," ISO/IEC 12207, IEEE Std 12207-2008, Second Edition, Feb. 1, 2008.
Extended European Search Report, dated Oct. 31, 2011, from corresponding EP Patent Application No. 11003284.4.

* cited by examiner

*Primary Examiner* — Jeong S Park
(74) *Attorney, Agent, or Firm* — Kenyon & Kenyon LLP (57) ABSTRACT

Embodiments of the present invention provide a method and system for managing life-cycles of a "software as a service" (SaaS) software application. In one embodiment, a method comprises installing the SaaS software application in a system landscape on a computer server, the system landscape containing at least an application server and a database (DB) server; separating system data from customer data and storing them in different databases; creating a virtual machine (VM) image for the system landscape, the VM image to include the databases containing system data and exclude the databases containing customer data; deploying the SaaS software application to one or more computer servers by loading VMs based on the VM image; when the SaaS software application need to be upgraded to a new version, preparing a new VM image with the new version of the SaaS software application and using the new VM image.

30 Claims, 7 Drawing Sheets

FIG. 1

(Prior Art)

LIFE-CYCLE MANAGEMENT OF MULTI-TENANT SAAS APPLICATIONS

FIELD OF THE INVENTION

The disclosure relates to a system and method for upgrading software systems, in particular, upgrading software systems running "software as a service" (SAAS) applications.

BACKGROUND

Cloud computing is gaining popularity in providing information technology (IT) services. Cloud computing is network-based computing (e.g., Internet-based), whereby shared resources, software and information are provided to computers and other devices on-demand, just like electricity. Today different technologies exist to provide IT services in the cloud, e.g.: virtualization and multi-tenancy.

Figure 1:
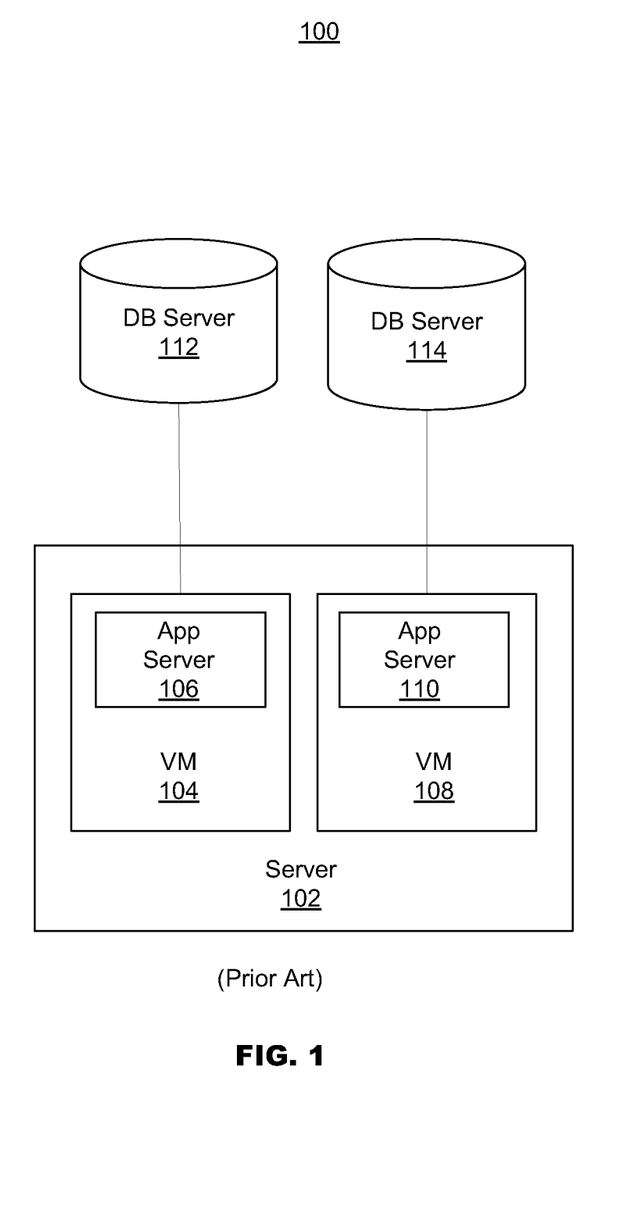
FIG. 1 is a prior art software system using VMs to provide IT services.

Server virtualization techniques allow a service provider to operate multiple applications independently in different virtual machines (VM) on the same physical hardware (e.g., different VMs for different clients, and/or different VMs for different requests from the same clients). Updates to a specific application running in a VM are not visible to other VMs. Pre-packaged VM images could be used to update each VM efficiently when all VMs run the same software. For example, FIG. 1 shows a prior art system 100 in which VM 104 and VM 108 are hosted by a server 102. Users may access applications running on App Server 106 or App Server 110 and save data to DB Sever 112 or 114 respectively. The DB Servers 112 and 114 may be software database applications running on dedicated hardware separate from the Server 102. An upgrade to a software application running on the App Server 106 will not be visible to applications on App Server 110 in VM 108. However, if App Server 106 and App Server 110 run the same software applications, one VM image containing upgraded software applications for App Server 106 may be used for both VM 104 and VM 108 (e.g., loading VM 104 and VM 108 in the server 102 from the same upgraded virtual machine image).

Figure 2:
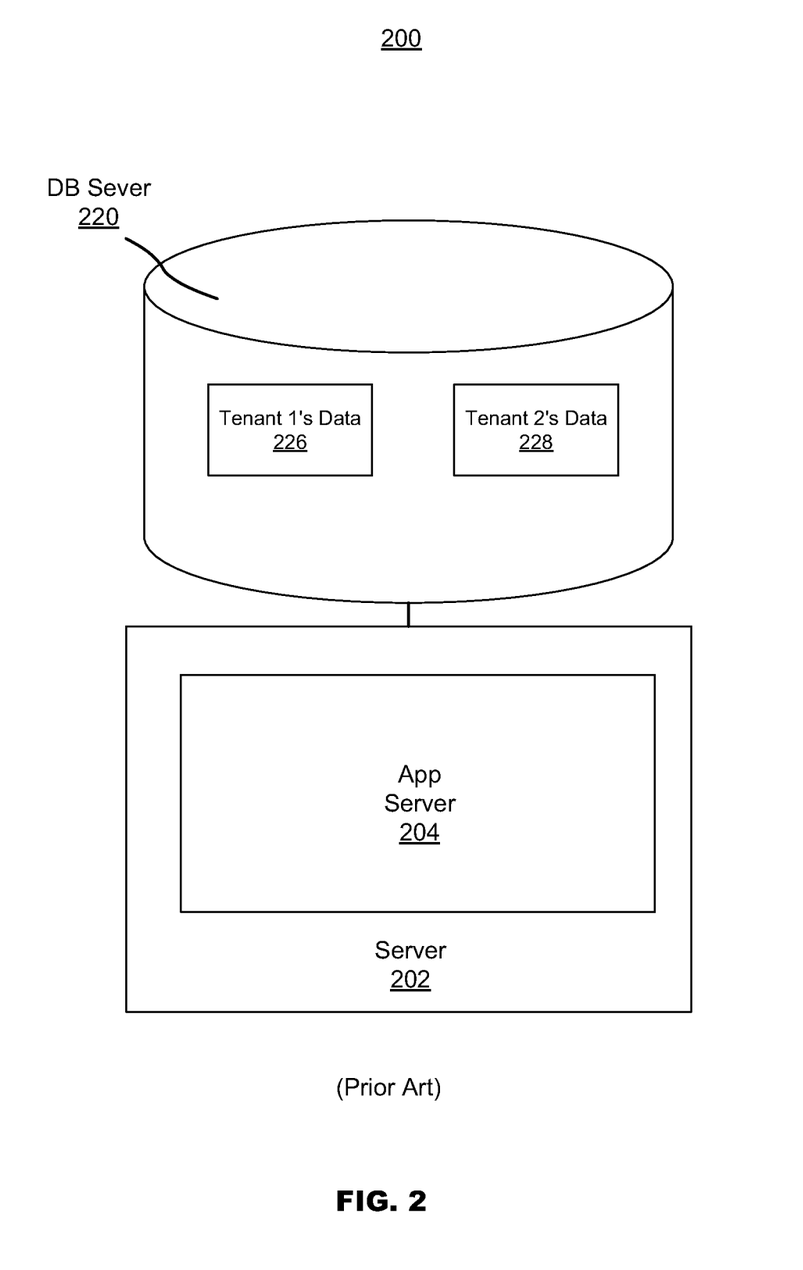
FIG. 2 is a prior art software system using multi-tenancy to provide IT services.

Multi-tenancy architectures provide services to users of multiple/different companies by sharing a single application running on the same hardware resources (e.g., same system landscape). Usually an application server hosts the front end layer of the application to interact with customers and a database (DB) server is used to store company data in separate tenants for each customer, such as the known multi-tenancy architecture 200 shown in FIG. 2. The multi-tenancy architecture 200 contains an application running on application server 204 that saves data to DB server 220. The application server 204 may be hosted by a server 202 but the DB server 220 may be hosted by the same or other dedicated hardware. The DB Server 220 typically stores tenant 1's data 226 and tenant 2's data 228 separately. Updates to the application in the App Server 204 and DB Server 220 are visible to all customers because they are shared by all customers.

Many SaaS offerings (e.g., SAP Business ByDesign, SAP eSourcing by SAP®) today employ multi-tenancy in order to optimize operational costs and hardware utilization. Many SaaS applications may be installed on more than one set of hardware resources to run the same version of a multi-tenant aware application. Each installed multi-tenant aware application may include at least an application on an application server and a database on a DB server. Currently, the application server and the DB server and other software systems required for the multi-tenant aware application are distributed among several hardware pieces (e.g., computer servers). Over time the total number and size of hardware resources running the multi-tenant aware applications will grow due to increased performance requirements. Typically, all of the installed applications need to be upgraded at the same time to avoid maintenance of different application versions. However, each installed package of the multi-tenant aware application is updated on all relevant hardware resources individually and manually. Hence costs associated with upgrading the applications on many hardware resources will become a determining factor that will diminish the cost advantage of multi-tenancy architectures significantly. Accordingly, there is a need in the art for simplifying the necessary steps of a software upgrade and bringing down the costs associated with maintaining a system landscape running a SaaS multi-tenant application.

DETAILED DESCRIPTION

Embodiments of the present invention provide a method and system for managing life-cycles of a "software as a service" (SaaS) software application. In one embodiment, a method comprises installing the SaaS software application in a system landscape on a computer server, the system landscape containing at least an application server and a database (DB) server; separating system data from customer data and storing them in different databases; creating a virtual machine (VM) image for the system landscape, the VM image to include the databases containing system data and exclude the databases containing customer data; deploying the SaaS software application to one or more computer servers by loading VMs based on the VM image; when the SaaS software application need to be upgraded to a new version, preparing a new VM image with the new version of the SaaS software application and using the new VM image.

Figure 3:
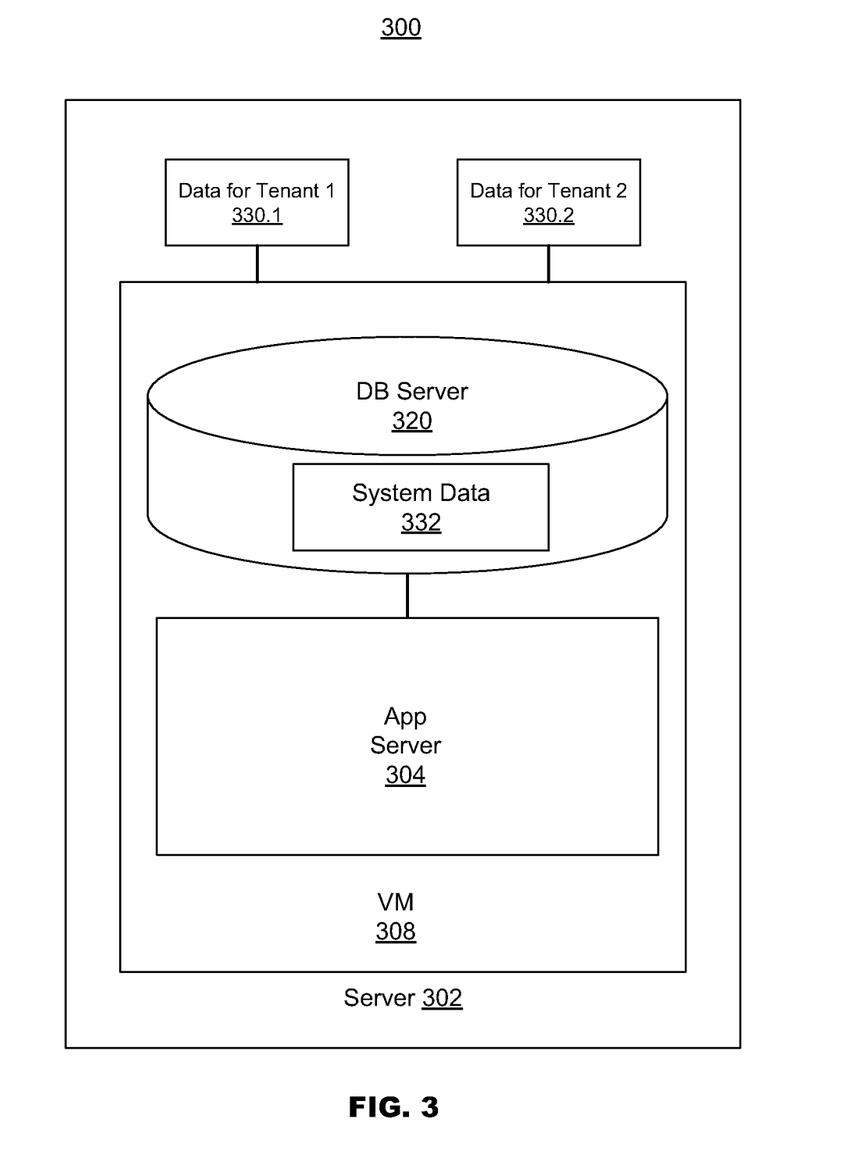
FIG. 3 is a block diagram for a multi-tenancy software application according to an exemplary embodiment of the present invention.

FIG. 3 illustrates an architecture 300 for a multi-tenancy software application according to an exemplary embodiment of the present invention. The architecture 300 may comprise a computer server 302. The computer server 302 may contain a virtual machine (VM) 308. The VM 308 may contain a system landscape of a SaaS software application. The system landscape may include an application (App) server 304 and a database (DB) server 320. The App server 304 may host a front end layer of the SaaS software application and the DB server 320 may manage and store data for the SaaS software application. The DB server 320 may store system data in a system data database 332. The system data may be, for example, technical configurations related to the system landscape. The SaaS software application may be a multi-tenant aware application and may store customer data in the databases, for example, Data for Tenant 1 stored in the database 330.1 and Data for Tenant 2 stored in the database 330.2. The databases 330.1 and 330.2 may be stored outside the system landscape and the VM 308. In one or more embodiments, the SaaS software applications may be business applications, consumer applications, or social applications. The system data may be changed when the system configuration is changed, and thus it may belong to the system landscape and not to be treated as customer data.

As shown in FIG. 3, the architecture 300 may separate the system related data from the customer related data such that they can be stored in different databases (e.g., system data to be stored in the database 332 and customer data to be stored in databases 330.1 or 330.2). In one embodiment, to maintain a separation between the system data and the customer data, the customer users do not modify any system data. Moreover, customer data may be kept independent from system data. For example, customer data does not contain any copies of or direct links to system data and in cases where customer data needs to reference system data, it is decoupled by using a system independent placeholder within the customer data that is replaced at runtime by the server with the correct system specific value (for example, a concrete server URL). Indexes for customer data may also be stored with the customer data.

In one embodiment, the databases for customer data and system data may be stored on different files or disk drives. For example, as shown in FIG. 3, the system data may be stored with the DB server 320 and stored inside the VM 308. However, the databases 330.1 and 330.2 for the customer data may be stored outside the VM 308 in different files or disk drives. In one embodiment, the databases 330.1 and 330.2 may even be stored in another computer server other than the server 302.

In one embodiment, the customer data may include four kinds of content: user data on which the application operates on, application configuration done by the customer, customer coding (e.g., extension to the software application) and associated configuration, and user data associated with customer coding. For example, customer extensions to a software application need to be stored as customer data because it may be done by a particular customer and not available in a generic version of the software.

The architecture 300 may provide an efficient way to manage life-cycles of multi-tenancy based SaaS or on-demand software applications including system (infrastructure) applications. In one embodiment, the architecture 300 according to the present invention may provide cost reduction from several prospects. For example, a quality assured VM image may become a pre-packed solution that contains many fixes. The fixes may cover every software piece of the system landscape and the VM image may be used to update multiple VM instances without affecting the customer data. In addition, as described below, necessary data migration for the customer data may be performed in the background by the system automatically as far as possible. Further, also as described below, system downtime experienced by the user may be reduced by providing partial services (e.g., for some critical functions) during the migration.

Figure 4:
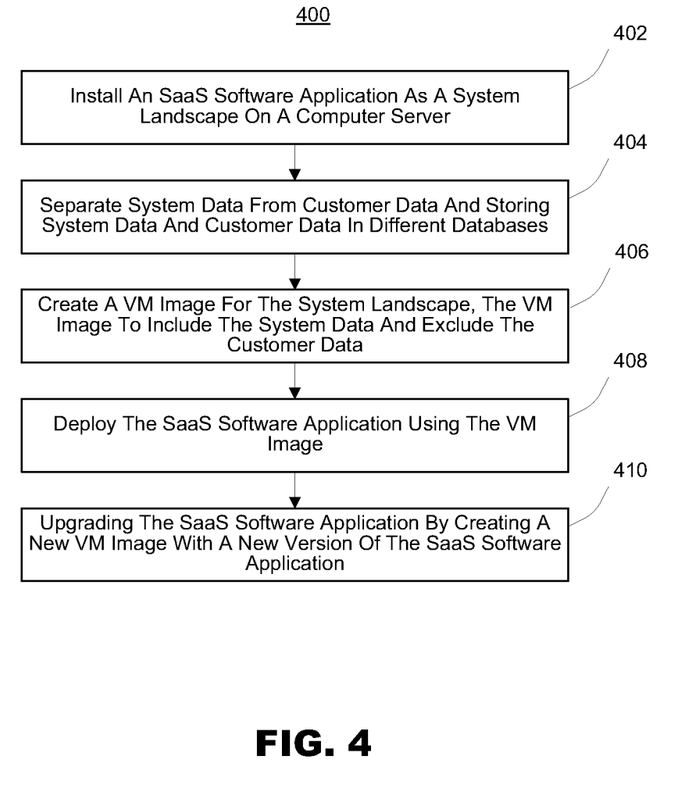
FIG. 4 is a flowchart for managing life-cycles of a SaaS software application according to an exemplary embodiment of the present invention.

FIG. 4 illustrates a process 400 for managing life-cycles of a SaaS software application according to an exemplary embodiment of the present invention. At step 402, a SaaS software application may be installed as a system landscape on a computer server. For example, the system landscape may include the App server 304 and DB server 320 as shown in FIG. 3. At step 404, system data may be stored separately from the customer data in different databases. For example, the system landscape may include the App server 304 and DB server 320 shown in FIG. 3. Next, at step 406, a VM image may be created for the system landscape and the VM image may include the system data but exclude the customer data. For example, the VM 308 may be created as shown in FIG. 3 to include the system landscape that includes the App server 304 and DB server 320. The database 332 for the system data may be contained inside the VM 308 and the databases 330.1 and 330.2 for the customer data may be excluded from the VM 308.

Then, at step 408, the SaaS software application may be deployed in production using the VM image. For example, a plurality of identical deployment of the SaaS software application may be accomplished by loading multiple VMs using the same VM image. In one embodiment, a fail-over support may be provided, in which one VM may be used as a hot standby for another VM that provides services to customers. The services may be critical and the hot standby does not need additional hardware resources (e.g., the standby VM may be loaded in the same computer server). In another embodiment, the system landscape may be easily migrated to another physical server that provides more hardware resources. In yet another embodiment, identical VMs may provide load balancing without administrative intervention.

Then, at step 410, the SaaS software application may be upgraded to a new version by creating a new VM image with the new version of the SaaS software application. In one embodiment, the new VM image may be tested with test data during the preparation. The test data may include customer data from existing databases for the customer data and new system data.

Figure 5:
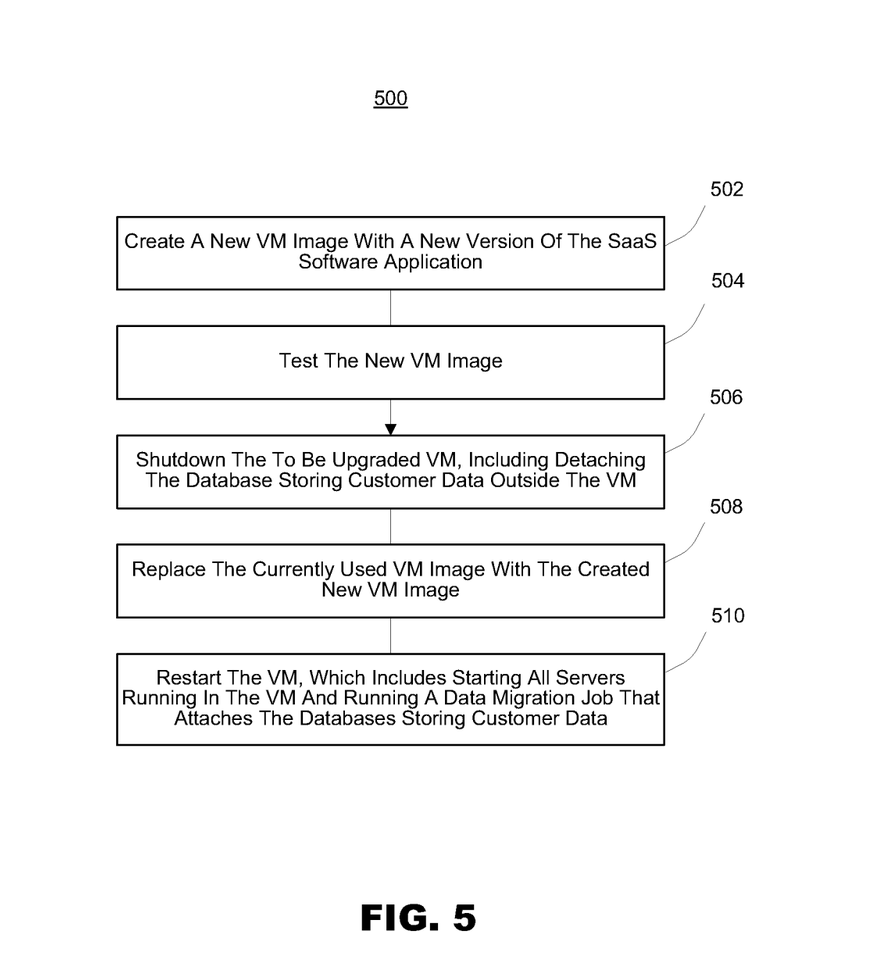
FIG. 5 is a flowchart for upgrading a SaaS software application according to an exemplary embodiment of the present invention.

FIG. 5 illustrates a process 500 for upgrading a SaaS software application according to an exemplary embodiment of the present invention. At step 502, a SaaS software application may be upgraded to a new version by creating a new VM image with the new version of the SaaS software application. At step 504, the new VM image may be tested during the preparation. In one or more embodiments, the test data may include customer data from existing databases for the customer data and new system data. Next, at step 506, a currently running VM may be shutdown. In one embodiment, the shutdown process may include disconnect the databases that store customer data outside the VM. For example, if the VM 308 is shutdown, the databases 330.1 and 330.2 may be disconnected from the SaaS software application. The database disconnection mechanism may depends DB server, for example, the database may be detached.

Then, at step 508, a currently used VM image may be replaced with the new VM image. For example, the VM 308 may be loaded from a currently used VM image and if the system landscape for the VM 308 need to be updated, a new VM image may be used to replace the currently used VM image.

Finally, at step 510, the VM instance may be restarted based on the new VM image. The starting of the VM instance may include starting all services running in the VM and starting a data migration job for customer data stored outside of the VM. In one embodiment, the data migration may be triggered automatically with an upgrade to an application. The data migration job may attach any databases for the customer data that are stored outside the VM and run as a background job that does not block the application. The application may become fully operational after the migration is finished and, during the migration, at least partial service may be provided. The at least partial service may include providing full functionality for already migrated part of whole data set and providing read access (e.g. a view) of data not yet migrated. Thus, this migration gradually changes the data in the background while the application is already providing partial services.

In one embodiment, the migration job may migrate the at least the four kinds of content of the customer data as described above: user data on which the application operates on, application configuration done by the customer, customer coding (e.g., extension to the software application) and associated configuration, and user data associated with customer coding. In one embodiment, the latter usually needs not to be migrated directly since the customer coding may not be changed by the upgrade. However, sometimes, the way user data associated with customer extensions is stored may be changed by an upgrade, the same techniques described below for customer coding belonging to the application may be applied.

For the first three types of customer data, in order for an application to detect a version change, a version number may be stored in the customer data (e.g., databases 330.1 or 330.2). The version number may be compared to the version of the application (stored as part of the system data in the database 332) when the application restarts with the VM. The version number may be kept for each record storing customer data or at least each root of a block of data that must be migrated in conjunction. In addition, a global version number may be provided for each tenant (e.g., each separate database 330.1 or 330.2) to check efficiently whether a data migration is necessary. The version information may be updated during (for each record) or after (globally) the migration, respectively.

In one embodiment, the version number may indicate a compatible version of the SaaS software application. Thus, if the new version of the SaaS software application in the VM detects that the version number associated with the customer data is not compatible, a migration of the customer data may be triggered. The version number associated with the data record may be used to provide full functionality for already migrated parts of the whole data set and only provide special view functionality (e.g., read access compatible with the old data format) for parts which are not yet migrated.

In embodiments, the configuration data provided by the customer may need to be migrated. In one embodiment, the migration may be done automatically without customer intervention. In this case, after the migration is done and an information note may be sent to an administrator or a customer. In another embodiment, the migration may not be performed automatically and an alert may be sent to the administrator or customer. In addition, default configuration may be used that allows the application to operate at least partially. This approach allows the customer to fix the problem asynchronously while the application may provide at least partial services.

The same strategy described above for the configuration data may be used for customer extensions as well. However, in case the customer extensions access part of the customer data maintained by the application, the customer extensions may need to be deactivated.

Further, in one embodiment, a scripting language, for example, JavaScript, may be employed for customer coding. In this case, some parts of the customer coded extensions may be customer data and yet other parts of the customer coded extensions may be system. Thus, customer coded extensions may need to split up the coding storage into customer and system parts. Consequently, the customer parts of the customer coding would then remain untouched by an upgrade.

In embodiments, the migration job may prioritize migration of data based on priorities of the customer data. For example, a higher priority may be given to most recent used data based on "time of change" timestamps associated with each data record respectively.

The process 500 may provide an efficient way of upgrading a SaaS software application. For example, after a new VM image is tested, each deployed SaaS software application landscape may be easily upgraded, which may be much less costly compared to the standard upgrade procedure. Further, due to the online migration strategy, the application can provide partial services as soon as possible and potentially faster than using an offline migration process during which the application must be down.

Figure 6:
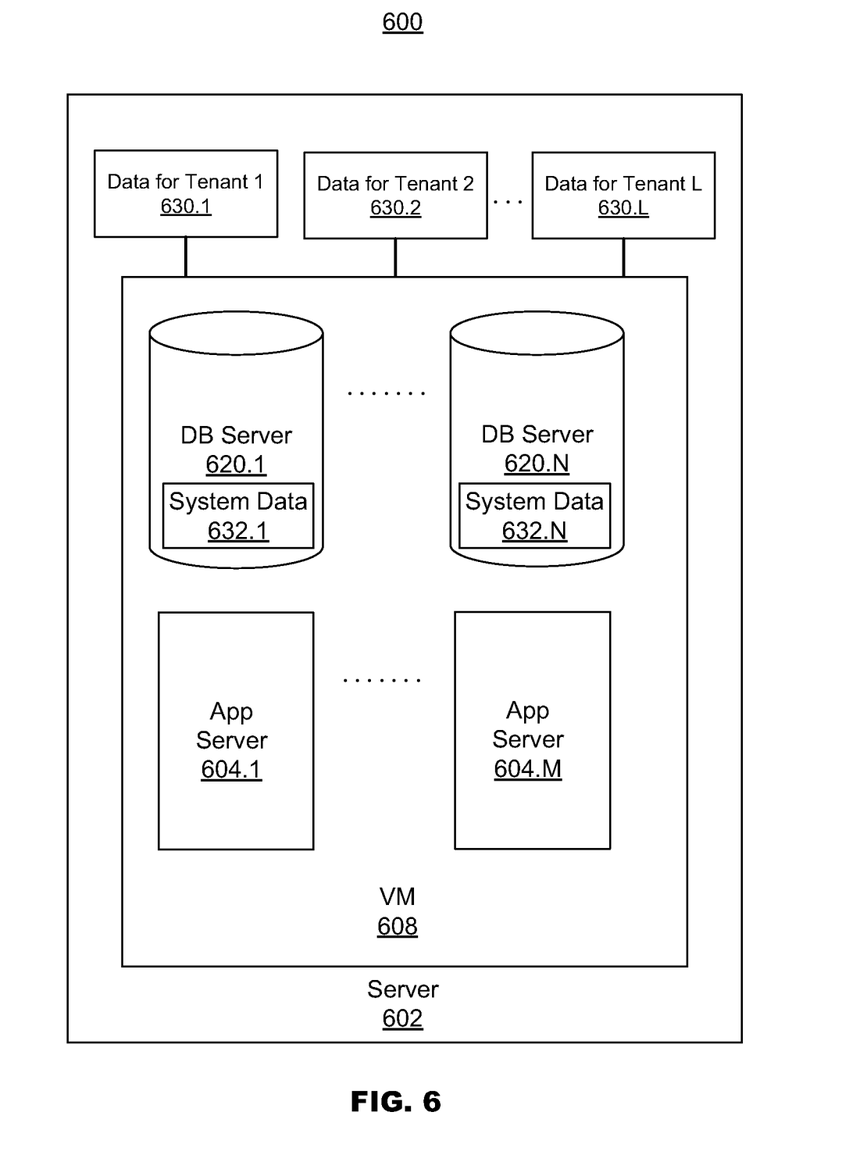
FIG. 6 is a block diagram for a multi-tenancy software application according to an exemplary embodiment of the present invention.

FIG. 6 illustrates an architecture 600 for a multi-tenancy software application according to another exemplary embodiment of the present invention. The architecture 600 comprises a computer server 602. The computer server 602 contains a virtual machine (VM) 608. The VM 608 contains a system landscape of a SaaS software application. The system landscape may include a plurality of application (App) servers 604.1 . . . 604.M and a plurality of database (DB) server 632.1 . . . 632.N. The App servers 604.1 . . . 604.M may host the front end layer of the SaaS software application and the DB servers 620.1 . . . 620.N may manage and stores data for the SaaS software application. The DB server 620.1 . . . 620.N may store the system data in system data databases 632.1 . . . 632.N. The SaaS software application may be a multi-tenant aware application and may store customer data in different databases for different tenants, for example, Data for Tenant 1 stored in the database 630.1, Data for Tenant 2 stored in the database 330.2, and Data for Tenant stored in the database 330.L. The databases 630.1 . . . 630.L may be stored outside the system landscape and the VM 608.

The term database is used herein to refer to an independently managed data storage unit that can be moved between different servers, e.g. DB or Content Management Servers (CMS servers) but not limited to them. For example, in some database systems the specific unit would be a database instance. Further, although the system landscapes in FIGS. 3 and 6 as described above only contain application servers and DB servers, an SaaS software application according to the present invention may also include system software, for example, operating system, web server, SMTP server, App server system, DB server system, and business applications, for example, Customer Relationship Management (CRM) or Travel and Expense Management applications. Moreover, although the description so far mentions the elements 330.1, 330.2 and 630.1 . . . 630.L as databases, on embodiment of the present invention may implement the data storage in file system.

In one embodiment, the DB server may be replaced with a Content Management Server (CMS). The CMS server may store system data as part of the system landscape but may store customer data outside the system landscape. In a further embodiment, data may be stored by file systems. The system data may be stored in a file system that is a part of the system landscape but the customer day may be stored in a file system that is not contained inside the system landscape.

In another embodiment, the life-cycle management and upgrade processes may be applied to hand-held devices or PCs. For example, system software and user specific data may be stored separately for hand-held devices or PCs according to the present invention, and thus system software may be loaded from a pre-packaged image. The pre-packaged image may be upgraded when a new version for the system software or for any piece of the system software becomes available.

Once the system software is upgraded, the customer data may be migrated as described above. Thus, partial service may be available during the data migration of hand-held device or PCs.

Figure 7:
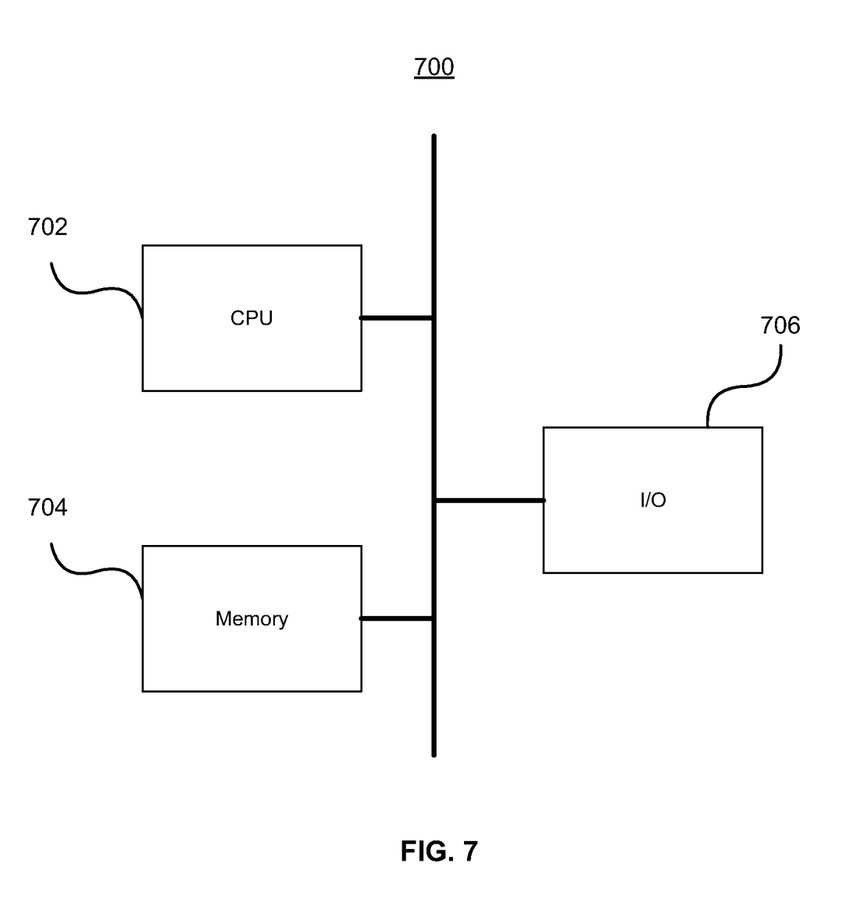
FIG. 7 shows a structure of a computer according to an exemplary embodiment of the present invention.

FIG. 7 depicts a structure of a computer server 700 according to one embodiment of the invention. The computer server 700 includes a processor 702, memory 704, and an I/O device(s) 706. The processor 702 is connected to the memory 704 and I/O device(s) 706. These connections are direct or via other internal electronic circuitry or components.

The processor 702 is a programmable processor that executes instructions residing in the memory 704 to receive and send data via the I/O device(s) 706. The instructions may perform the operations of the application context and rule based UI control described herein. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention processor 702 is an Intel™© microprocessor.

Memory 704 is a machine-readable medium that stores data that is processed by processor 702. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 702 via one or more I/O device(s) 706.

The I/O device(s) 706 may be one or more input/output interfaces that receive and/or send digital data to and from an external device. Interfaces as used herein are any point of access to an external device where digital data is received or sent, including ports, buffers, queues, subsets thereof, or any other interface to an external device.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A method for managing life-cycles of a software as a service software application, comprising:
    installing the software as a service software application in a system landscape on a computer server, the system landscape containing at least an application server and a database server;
    separating system data for the software as a service software application from customer data of a plurality of customers for the software as a service software application and storing the system data and customer data in different databases, wherein customer data is stored outside of the system landscape and customer data is decoupled from system data by replacing copies or links to system data within the customer data with one or more system independent placeholders;
    creating a virtual machine image for the system landscape, the virtual machine image to include the databases containing system data and exclude the databases containing the customer data;
    deploying the software as a service software application to one or more computer servers by loading virtual machines on one or more computer servers based on the virtual machine image; and
    when the software as a service software application is to be upgraded to a new version, preparing a new virtual machine image with the new version of the software as a service software application and deploying the new version of the software as a service software application by loading virtual machines on the one or more computer servers based on the new virtual machine image.

2. The method of claim 1, wherein the new virtual machine image is tested with test data or the customer data during the preparation and includes new databases for the system data.

3. The method of claim 1, wherein the customer data refers to system data by using a system independent placeholder is replaced at runtime with a correct system specific value.

4. The method of claim 1, wherein deploying the new version of the software as a service software application includes shutting down a currently running virtual machine and restarting a virtual machine using the new virtual machine image, the shutdown process includes detaching any databases storing the customer data, and the restart process includes starting all applications running in the virtual machine and starting a data migration job.

5. The method of claim 4, wherein the migration job is a background job that does not block the application and at least partial service is provided before the migration job is fully completed.

6. The method of claim 5, wherein the at least partial service includes providing full functionality for already migrated part of whole data set and providing read access to data not yet migrated.

7. The method of claim 6, wherein the read access is provided by a view to the data not yet migrated.

8. The method of claim 4, wherein the migration job migrate data based on priority and a higher priority is given to most recent used data based on time of change timestamps associated with each data record respectively.

9. The method of claim 1, the each record has an associated version number, the version number indicates a compatible version of the software as a service software application.

10. The method of claim 1, wherein the customer data includes one or more of: user data on which the application operates on, application configuration done by a customer, customer coded extension to the application and associated configuration, and user data associated with customer coding.

11. The method of claim 10, wherein when the customer data includes application configuration, the application configuration is migrated automatically or replaced with a default value if it is no longer valid for the new version of software as a service software application.

12. The method of claim 10, wherein when the customer data includes a customer coded extension, the application coded extension is migrated automatically or replaced with a default value if it is no longer valid for the new version of software as a service software application.

13. A method for upgrading a computing device, comprising:
    separating customer data from system software on the computing device, wherein customer data is stored outside of a system landscape and customer data is decoupled from system data by replacing copies or links to system data within the customer data with one or more system independent placeholders;

creating a pre-packaged image with a new version of the system software;

testing the pre-packaged image with test data;

shutting down the computing device;

installing the new version of the software as a service system software using the pre-packaged image; and restarting the computing device, the restart including triggering a data migration job for the customer data, wherein the data migration job is a background job that does not block the computing device and at least partial service is provided before the migration job is fully completed, the at least partial service includes providing full functionality for already migrated part of whole data set and providing read access to data not yet migrated.

14. The method of claim 13, wherein the test data includes customer data.

15. The method of claim 13, wherein the customer data includes one or more of:
user data on which the application operates on, application configuration done by a customer, customer coded extension to the application and associated configuration, and user data associated with customer coding.

16. The method of claim 13, wherein the customer data refers to system data by using a system independent placeholder that is replaced at runtime with a correct system specific value.

17. The method of claim 13, wherein the read access is provided by a view to the data not yet migrated.

18. The method of claim 13, wherein the migration job migrate data based on priority and a higher priority is given to most recent used data based on time of change timestamps associated with each data record respectively.

19. The method of claim 13, wherein unit of data record for migration or each data record has an associated version number, the version number indicates a compatible version of the software as a service system software.

20. The method of claim 13, wherein the computing device is a computer server or PC.

21. The method of claim 13, wherein when the customer data includes application configuration, the application configuration is migrated automatically or replaced with a default value if it is no longer valid for the new version of software as a service system software.

22. A system comprising:
a computing device configured to run a virtual machine (VM), the VM to host a system landscape for a software as a service software application, the system landscape comprising:
an application server; and
a database server;
wherein the database server stores system data and customer data of a plurality of customers for the software as a service software application in different databases, and the databases for the system data are contained in the virtual machine and the databases for the customer data are outside of the virtual machine, customer data being decoupled from system data by replacing copies or links to system data within the customer data with one or more system independent placeholders, and
when the software as a service software application is to be upgraded to a new version, the computing device is configured to: detach the databases for the customer data from the database server;
shut down the database server and application server;
reloading a new virtual machine from a new virtual machine image containing the new version of the software as a service software application;
attach the databases for the customer data; and
start a migration job for the customer data.

23. The system of claim 22, wherein the new virtual machine image is tested using test data that includes customer data.

24. The system of claim 22, wherein the customer data includes one or more of: user data on which the application operates on, application configuration done by a customer, customer coded extension to the application and associated configuration, and user data associated with customer coding.

25. The system of claim 22, wherein the customer data refers to system data by using a system independent placeholder that is replaced at runtime with a correct system specific value.

26. The system of claim 22, wherein the migration job is a background job that does not block the application and at least partial service is provided before the migration job is fully completed, the at least partial service includes providing full functionality for already migrated part of whole data set and providing read access to data not yet migrated.

27. The system of claim 26, wherein the read access is provided by a view to the data not yet migrated.

28. The system of claim 22, wherein the migration job migrate data based on priority and a higher priority is given to most recent used data based on time of change timestamps associated with each data record respectively.

29. The system of claim 22, wherein each unit of data record for migration or each data record has an associated version number, the version number indicates a compatible version of the software as a service software application.

30. The system of claim 22, wherein when the customer data includes application configuration, the application configuration is migrated automatically or replaced with a default value if it is no longer valid for the new version of software as a service software application.

* * * * *